(12) United States Patent
Miyazawa

(10) Patent No.: US 7,270,426 B2
(45) Date of Patent: Sep. 18, 2007

(54) MULTI-PROJECTION DISPLAY AND PROJECTOR

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 11/052,232

(22) Filed: Feb. 8, 2005

(65) Prior Publication Data

US 2005/0179874 A1 Aug. 18, 2005

(30) Foreign Application Priority Data

Feb. 12, 2004 (JP) ............................ 2004-035098

(51) Int. Cl.
*G03B 21/26* (2006.01)
(52) U.S. Cl. ......................................... 353/94; 353/30
(58) Field of Classification Search .................. 353/30, 353/33, 81, 94, 891, 89, 97; 352/133
See application file for complete search history.

(56) References Cited

U.S. PATENT DOCUMENTS 6,513,938 B2 * 2/2003 Kubota et al. ................ 353/94

6,637,887 B2 * 10/2003 Yamanaka .................... 353/30
6,986,583 B2 * 1/2006 Nishio et al. .................. 353/94

FOREIGN PATENT DOCUMENTS

JP 06-169444 A 6/1994
JP 2001-268476 A 9/2001

* cited by examiner

*Primary Examiner*—Rodney Fuller
(74) *Attorney, Agent, or Firm*—Oliff & Berridge, PLC

(57) ABSTRACT

Exemplary embodiments uniformize light intensity during projection, by tiling, in a state having an overlap of projection images respectively from a plurality of projectors in part thereof. A semi-transmissive shadow plate to adjust the amount of light to an overlap is provided inner of a projector housing than a projection lens, e.g., on a light-exit side surface of a cross dichroic prism. The semi-transmissive shadow plate can be movably arranged to cope with a form, size and position of the overlap.

15 Claims, 17 Drawing Sheets

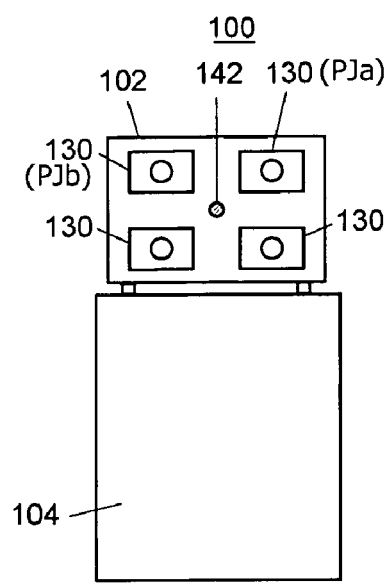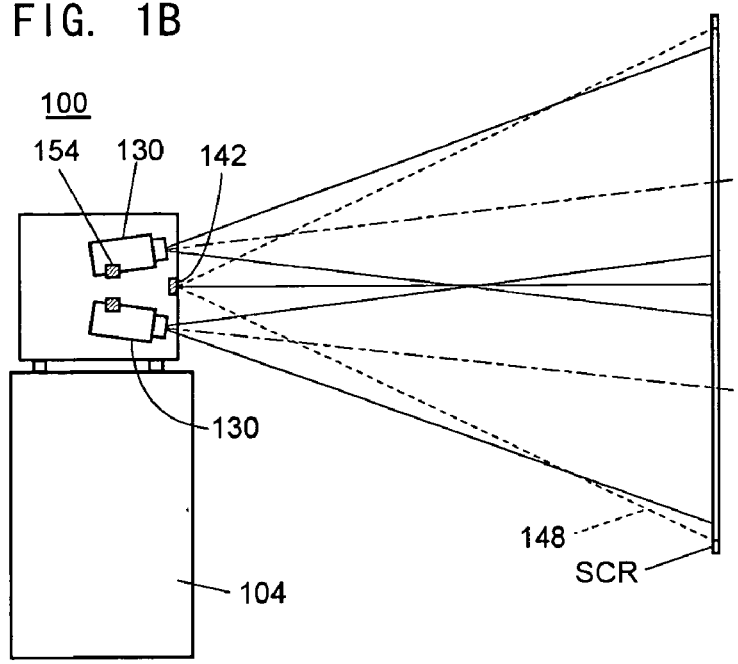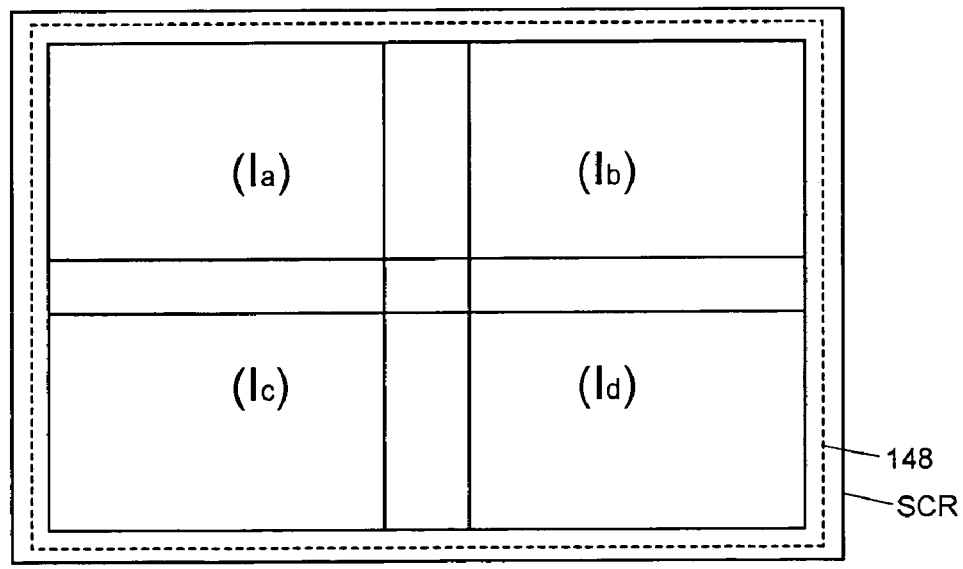

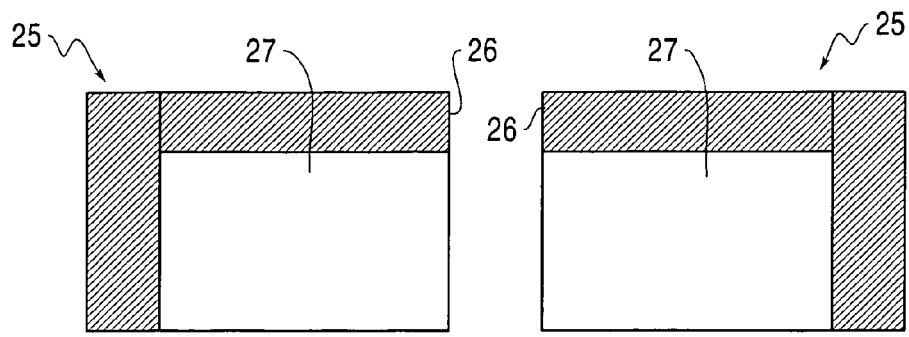
FIG. 3A
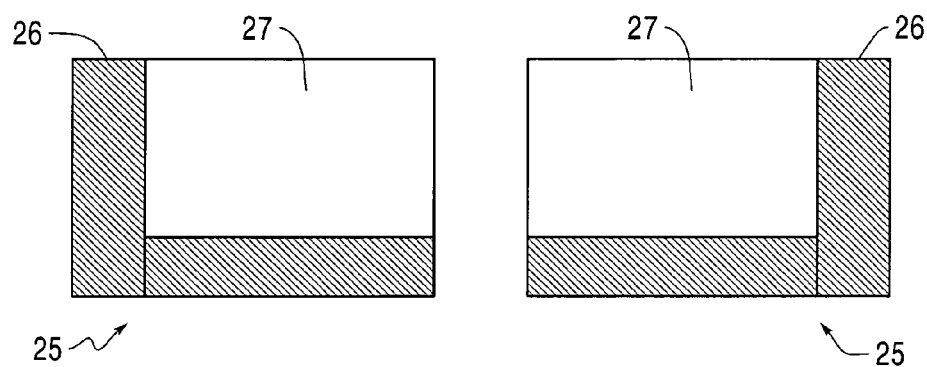
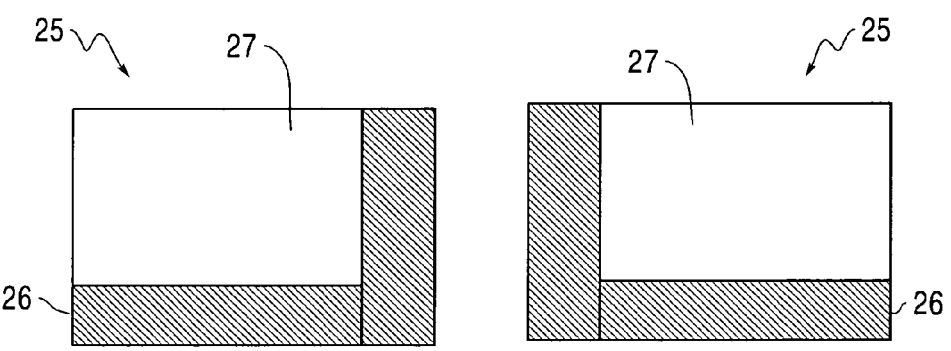
FIG. 3B
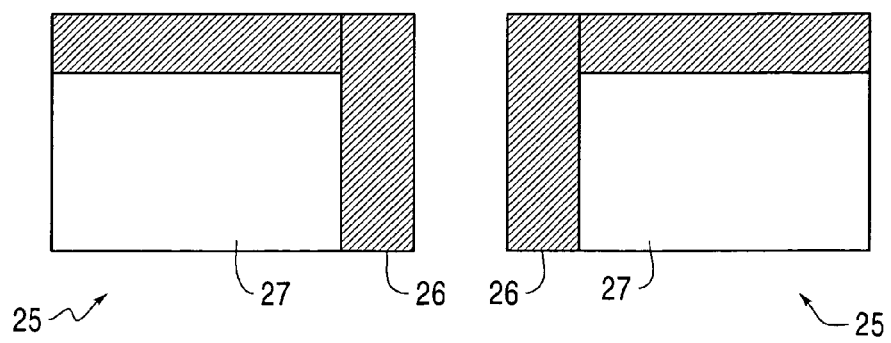

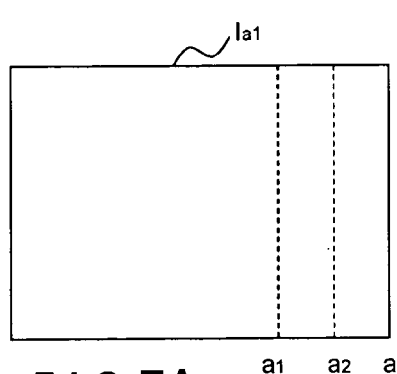
F I G. 7A
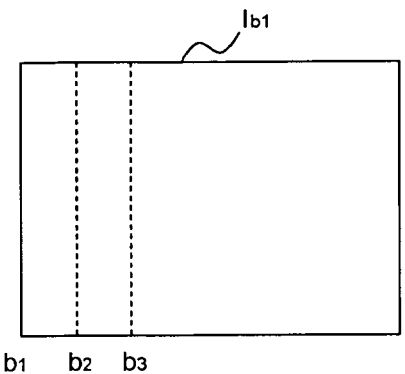
F I G. 7B
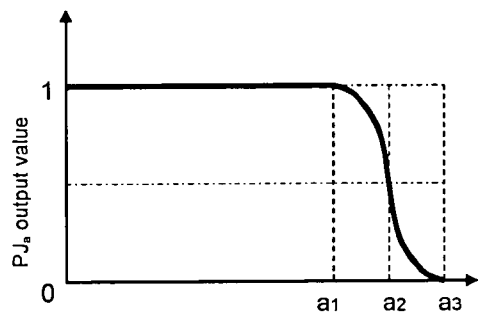
F I G. 7C
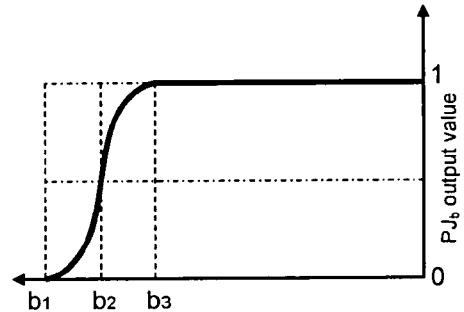
F I G. 7D
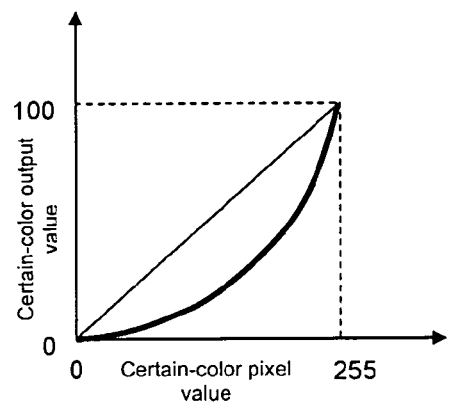
F I G. 8A
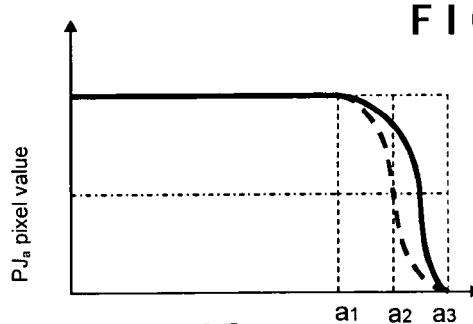
F I G. 8B
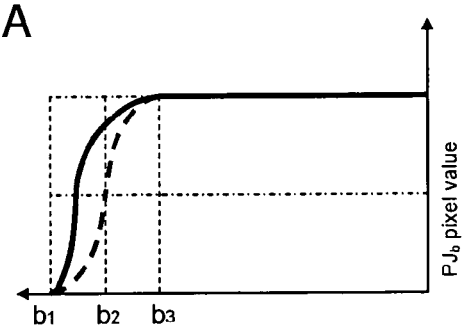
F I G. 8C

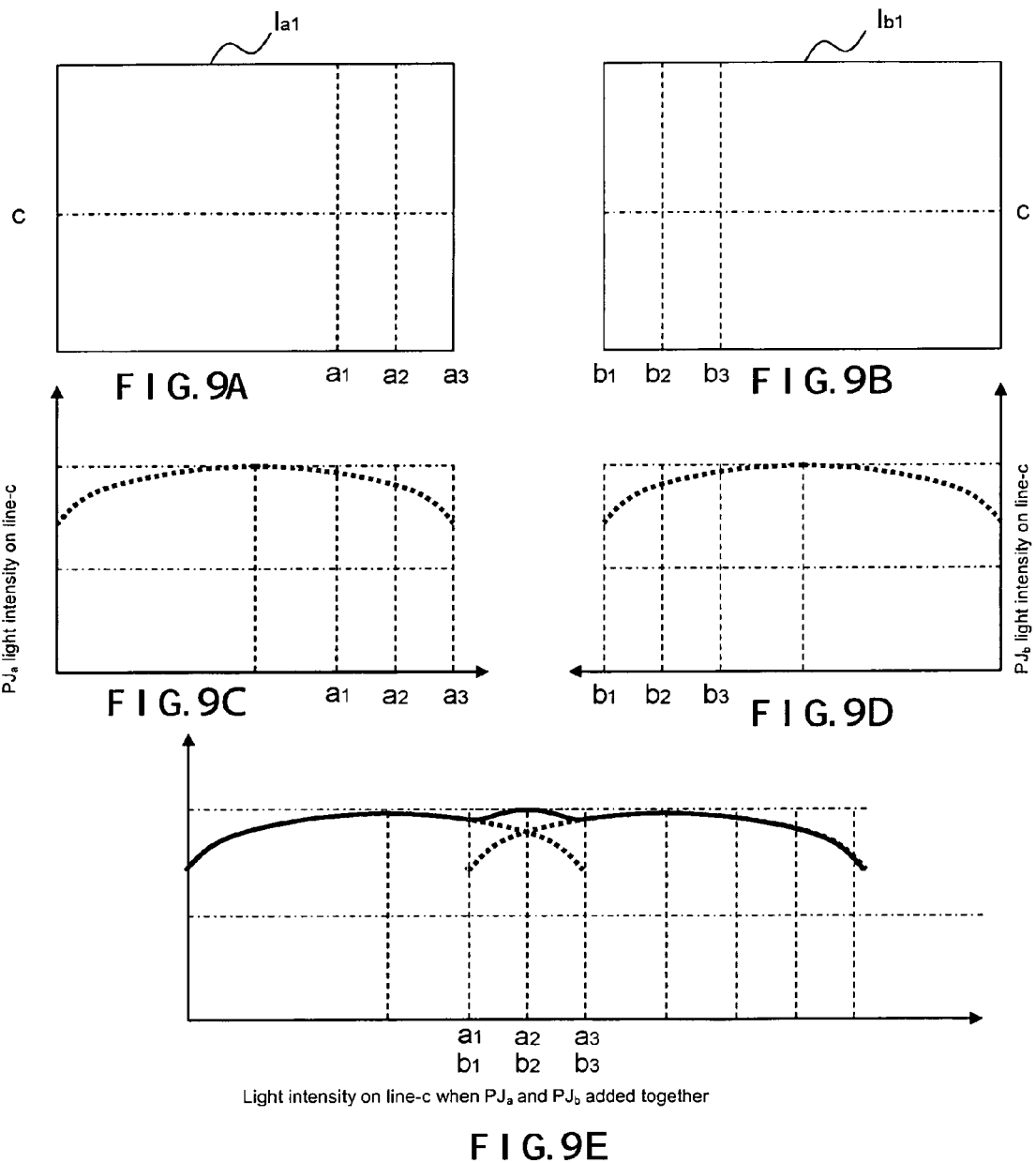

MULTI-PROJECTION DISPLAY AND PROJECTOR

BACKGROUND

The exemplary embodiments relate to a multi-projection display and a projector to use on the multi-projection display.

In the related art, there are multi-projection displays arranged with a plurality of projection optical units (assumed projectors) horizontally and vertically so that a large-area image can be displayed by projecting images from these projectors through tiling. Here, tiling projection means a projection scheme to display a large on-screen image by allocating, in a tiling form, the regions of projection from a plurality of projectors over the screen.

The multi-projection displays of the related art are capable of displaying an image higher in definition and brightness than those of the usual projectors. They are expected to broadly spread in the future, in the business field of movie theaters, art galleries, museums, seminar halls, assembly hall, minitheaters, public institutions and enterprises, as well as in the home-use fields of amusement and home theaters, or the like.

With the related art multi-projection displays, there is a general practice to partly overlap, over the screen, the projection images from adjacent ones of projectors. In partly overlapping the images projected from adjacent projectors over the screen in this manner, light intensity is higher at an overlap than at the other regions, raising a problem of conspicuous boundaries.

Particularly, with a projector using liquid-crystal light valves, the liquid-crystal light valve even for black (data value=0) in color is passed by a somewhat amount of light. Thus, there is a problem of so-called "black float", i.e. light intensity is higher at an overlap of projection images from a plurality of projectors than at the regions free of overlaps.

FIG. 18 is a schematic explaining such "black float". FIG. 18 shows a case in which tiling projection is carried out by four projectors, the light intensity of black being higher at an overlap 10 than at the other overlap-free regions. There are various proposals to solve problems associated with light intensity at overlap including an example described in JP-A-2001-268476.

JP-A-2001-268476 discloses an arrangement of a shade plate, etc. on the optical axis between the projector and the screen, to thereby adjust the light intensity at an overlap, making the light intensity at the overlap equivalent to that of other regions.

Meanwhile, some technologies cited in JP-A-2001-268476 describe that, by adopting shadow plates, light intensity at an overlap is made equivalent to those of other regions. For example, in JP-A-6-169444 cited in JP-A-2001-268476, there is a disclosure that the light intensity at the overlap is made equivalent to those of the other regions by providing a shadow plate on a lens unit having a projection lens.

SUMMARY

The related art including JP-A-2001-268476 and JP-A-6-169444 each have a provision between the projection lens unit and the screen or in the projection lens unit. Namely, the related art aims at adjusting light intensity at an overlap without changing the internal structure to the existing projector. Hence, it can be considered that the shadow plate is necessarily provided at or rear to the projection lens unit (closer to the screen).

In this manner, in the method of adjusting light intensity by the provision of a shadow plate at or rear to the projection lens unit as in JP-A-2001-268476 and JP-A-6-169444, there is a problem that light intensity cannot be adjusted with accuracy, requiring much time in the adjustment.

Namely, in the case of JP-A-2001-268476, the front multi-projector necessarily secures a setup location of the shadow plate and further requires fine adjustment to decide a suitable setup location. Furthermore, there is a problem that, at certain setup locations, there is a possibility to obstruct the field of sight of the user who is viewing the image displayed on the screen. Meanwhile, in the back multi-projector, a shadow plate is provided rear to the projection lens. Accordingly, in the case of rear-projection type, the shadow plate itself is expectedly made greater in size and difficult to adjust. Meanwhile, in the case of JP-A-6-169444, because the shadow plate is provided at the projection lens unit, the shadow plate is difficult to control. It can be considered that handling is not easy to effect as to the form, size and position of an overlap.

Therefore, the exemplary embodiments provide a multi-projection display and a projector to use in such a multi-projection display such that the foregoing problem is addressed or eliminated by providing a shadow plate within a projector housing, the variation in light intensity being reduced, minimized or eliminated between the intensity level at the overlap and the light intensity at other regions to a possible extent, thus enabling quality tiling projection.

(1) A multi-projection display of the exemplary embodiments is a multi-projection display to project images including a plurality of projectors to project a plurality of unit images by tiling in a state having an overlap in part thereof, each of the projects including a projector housing, a projection lens and a light-amount adjusting device, to adjust an amount of light to the overlap, provided inner of the projector housing than the projection lens of each of the projectors.

By thus providing the light-amount adjusting device, to adjust an amount of light to the overlap, inner of the projector housing than the projection lens in each of the projectors constituting a multi-projection display, the projection image in its entirety obtained by tiling projection can be made uniform in light intensity with higher accuracy. Meanwhile, the problem of obstructing the field of sight of the user who is viewing the image displayed on the screen, as encountered in JP-A-2001-268476 can be reduced, minimized and/or eliminated. Incidentally, the multi-projection display of the exemplary embodiment can structure any of multi-projection displays regardless of front projection type or rear projection type.

(2) In the multi-projection display as set forth in (1), the light-amount adjusting device being provided on a light-exit side of the cross-dichroic prism, which is included as one example.

Due to this, it is possible to easily structure the multi-projection device as set forth in (1). Meanwhile, by providing the light-amount adjusting device on the light-exit side of the cross dichroic prism, the light-amount adjusting device may be one in number, thus simplifying the structure of the projector optical system.

(3) In the multi-projection display as set forth in (1), the light-amount adjusting device can be provided on at least one of a light-incident side and a light-exit side of a corresponding one of the electro-optical modulators to light components.

Due to this, it is possible to easily structure the multi-projection display as set forth in (1). Meanwhile, by providing the light-amount adjusting device separately based on each color component, it is possible to reduce, minimize or eliminate the heat to be applied to each of the light-amount adjusting device.

(4) In the multi-projection display as set forth in any of (1) to (3), the light-amount adjusting device being formed by a semi-transmissive shadow plate having a semi-transmissive region.

In this manner, because it is satisfactory to prepare a semi-transmissive shadow plate having a semi-transmissive region and set up the semi-transmissive shadow plate, application is easy for the existing projector.

(5) In the multi-projection display as set forth in (3), a reflectivity-changed region to adjust a reflectivity of the reflector plate can be provided in part of a reflector plate to cause light from a light source to enter the electro-optical modulator, the reflectivity-changed region being used as the light-amount adjusting device.

This also can easily structure the multi-projection display as set forth in (1).

(6) In the multi-projection display as set forth in (3), a transmissivity-changed region to adjust a transmissivity of the dichroic mirror being provided in part of a dichroic mirror, the transmissivity-changed region being used as the light-amount adjusting device.

This also can easily structure the multi-projection display as set forth in (1).

(7) In the multi-projection display as set forth in (3), an imaging device for taking an image of a projection image is provided.

By providing such an imaging device, the use of a photographic image obtained due to the imaging device makes it possible to carry out various corrections and adjustments, such as form and image corrections on an image projected by each projector. Thus, a high-quality tiling-projected image can be obtained.

(8) In the multi-projection display as set forth in (1) to (7), the light-amount adjusting device being allowed to set a light-amount adjusting range in accordance with a state of the overlap.

This enables light-amount adjustment to correspond to the state (form, size, position, etc.) of an overlap, making it possible to have uniform light intensity over the entire image projected with tiling with high accuracy.

(9) In the multi-projection display as set forth in (8), setting a light-amount adjusting range can be based on a photographic image obtained by the imaging device.

By thus making a setting of a light-amount adjustment range depending upon a photographic image obtained by the imaging device, it is possible to suitably, automatically set a light-amount adjustment range in accordance with the state (form, size, position, etc.) of an overlap.

(10) In the multi-projection display as set forth in any of (1) to (9), the light-amount adjusting device has at least one of a transmissivity and reflectivity changing with a position on the projection image.

By thus assuming that transmissivity and reflectivity change with a position on a projection image and using a changed transmissivity or reflectivity as in FIGS. 7(C) and 7(D) explained later, light amount adjustment on an overlap can be effected similarly to software processing. This also makes it possible to omit software processing greater in operation quantity. Meanwhile, even in making a software processing, the operation quantity thereof can be greatly reduced.

(11) In the multi-projection display as set forth in any of (1) to (10), it is possible to provide an image correcting device to enable a light-intensity adjustment process based on software processing, and perform a light-intensity adjustment process by the image correcting device in addition to light-amount adjustment by the light-amount adjusting device.

By thus performing a light-intensity adjustment process based on software processing in the image correcting device in addition to light intensity adjustment by the light-amount adjusting device, it is possible to make a correction absorbing the variations in light intensity between adjacent projectors and hence to have uniform light intensity over the entire projected image with high accuracy.

(12) In the multi-projection display as set forth in (11), the light-intensity adjustment process by the image correcting device may be performed based on a photographic image obtained by the imaging device.

By thus effecting a light-intensity adjustment process by the image correcting device depending upon a photographic image obtained by the imager device, light intensity adjustment can be carried out automatically and suitably.

(13) A projector of the exemplary embodiments is a projector for use in a multi-projection display to project images from a plurality of projectors to project a plurality of unit images by tiling in a state having an overlap in part of adjacent ones of projection images. The projector has a projector housing, a projection lens, and a light-amount adjusting device, to adjust an amount of light to the overlap, provided inner of the projector housing than the projection lens.

By using such a projector, the multi-projection display in (1) can be easily structured, to obtain the effect set forth in (1). Incidentally, the projector is applicable to both of a front multi-projection display and a rear multi-projection display.

Meanwhile, in the projector as set forth in (13), the light-amount adjusting device may be provided on a light-exit side of a cross dichroic prism, or provided on a light-incident or light-exit side of electro-optical modulators corresponding to components of light. Furthermore, the light-amount adjusting device may be formed by a semi-transmissive shadow plate having a semi-transmissive region.

Meanwhile, in the projector as set forth in (13), a reflector plate to enter light from a light source can be provided, in part thereof, with a reflectivity-changed region to adjust a reflectivity of the reflector plate, the reflectivity-changed region being used as the light-amount adjusting device. Meanwhile, a dichroic mirror can be provided, in part thereof, with a transmissivity-changed region to adjust a transmissivity of the dichroic mirror, the transmissivity-changed region being used as the light-amount adjusting device.

Meanwhile, in the projector as set forth in (13), the light-amount adjusting device is capable of setting a light-amount adjustment range in accordance with a state of the overlap. At this time, setting a light-amount adjustment range can be effected on the basis of a photographic image obtained by the imaging device.

Meanwhile, in the projector as set forth in (13), the light-amount adjusting device has a transmissivity or reflectivity to change with a position on the projection image.

Meanwhile, in the projector as set forth in (13), a light-intensity adjustment process based on software processing can be performed in addition to light intensity adjustment by the light-amount adjusting device. At this time, the light-intensity adjustment process by software processing can be performed based on a photographic image obtained by the imaging device.

BRIEF DESCRIPTION OF THE DRAWINGS

FIGS. 1A-1C are schematics showing a structure of a front multi-projection display according to an exemplary embodiment;

FIGS. 3A and 3B are schematics showing an example of semi-transmissive shadow plates according to the exemplary embodiment;

FIGS. 6(i)-6(iii) are schematics explaining a form-correcting operation for the front multi-projection display according to the exemplary embodiment;

FIGS. 7A-7D are schematics explaining a light-intensity adjustment process by a unit-image information correcting section of the front multi-projection display according to the exemplary embodiment;

FIGS. 8A-8C are schematics explaining a light-intensity adjustment process by the unit-image information correcting section of the front multi-projection display according to the exemplary embodiment;

FIGS. 9A-9E are schematics explaining a light-intensity adjustment process by the unit-image information correcting section of the front multi-projection display according to the exemplary embodiment;

DETAILED DESCRIPTION OF EMBODIMENTS

Figure 2:
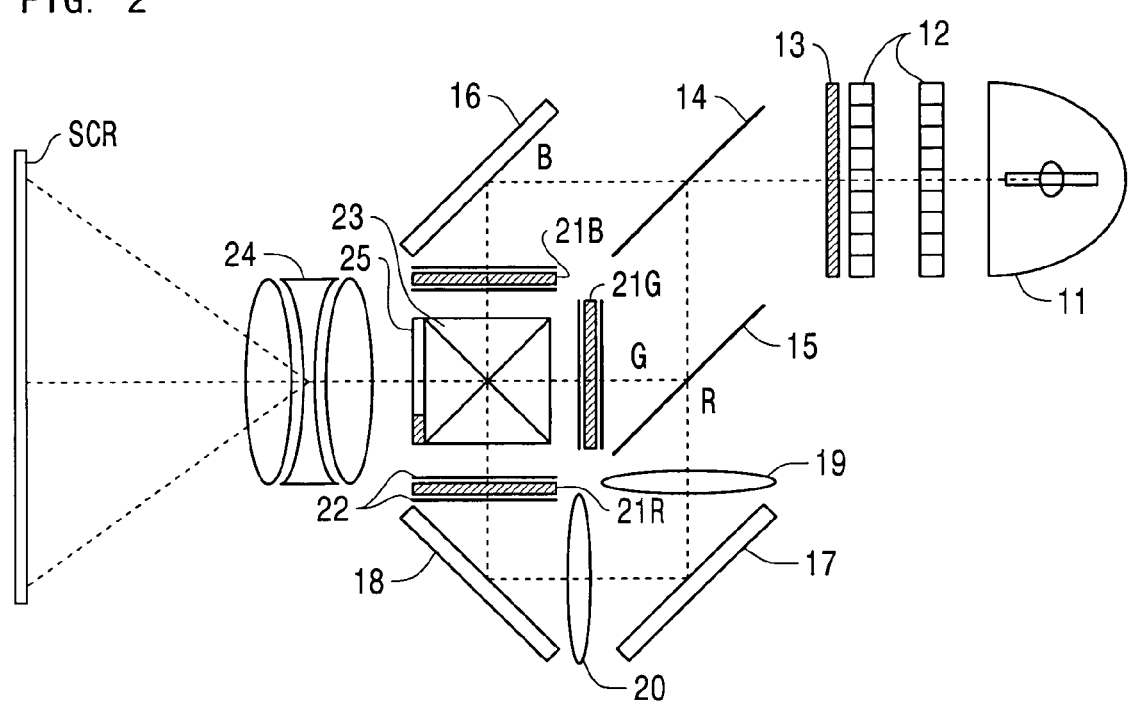
FIG. 2 is a schematic showing a construction of an optical system of a projector according to the exemplary embodiment.

The exemplary embodiment is applicable to both of a front multi-projection display and a rear multi-projection display. However, the exemplary embodiments shown below explain applications to a front multi-projection display.

FIGS. 1A-1C are schematics showing a structure of a front multi-projection display according to the present exemplary embodiment (hereinafter, referred to as a multi-projection display). FIG. 1(A) is a front view, FIG. 1(B) is a sectional view as viewed at the side, and FIG. 1(C) is a view showing an projection image thrown onto the screen.

The multi-projection display 100 in this embodiment is a multi-projection display adapted to throw an image from the four projectors 130 arranged within a housing 102 onto a screen SCR as a projection plane, as shown in FIG. 1. The multi-projection display 100 is used by being set up, for example, on a pedestal 104, as shown in FIGS. 1A-1C.

Meanwhile, there is provided an imaging device 142 of an imager 140 (see FIG. 5) within the housing 102 (at an immediate inside of its front surface). The imager 140 covers an imaging range, or a range shown by the broken line on the screen SCR (hereinafter, referred to as an imaging range 148). However, the imaging range 148 is to be set at a desirable position.

Meanwhile, each projector 130 is provided with an optical correction device 154 to optically correct the location and position of the housing of the projector 130.

FIG. 2 is a view showing a construction of the optical system of the projector 130 shown in FIGS. 1A-1C. The projector 130 has, as shown in FIG. 2, a light source 11, an integrator lens 12, a polarization converter element 13, a dichroic mirror 14 to pass blue light (B) but to reflect red light (R) and green light (G), a dichroic mirror 15 to pass red light (R) but to reflect green light (G), liquid-crystal light valves 21R, 21G, 21B for respective color components (red, green, blue) to act as electro-optic converters, a reflector plate 16 allowing blue light to enter the liquid-crystal light valve 21B, two reflector plates 17, 18 to allow red light to enter the liquid-crystal light valve 21R, a focus lens 19 disposed between the dichroic mirror 15 and the reflector plate 17, a focus lens 20 disposed between the reflector plate 17 and the reflector plate 18, polarizer plates 22 provided on the light-incident and light-exit sides of the respective liquid-crystal light valves 21R, 21G, 21B, a cross dichroic prism 23 and a projection lens 24.

In each projector 130, a semi-transmissive shadow plate 25 as light-amount adjusting device is provided inward of the housing of the projector 130 (this is referred to as a projector housing) rather than the projection lens 24. Note that there is shown, in FIG. 2, an exemplary embodiment with the semi-transmissive shadow plate 25 provided on a light-exit side of the cross dichroic prism 23.

FIG. 3(A) is a view explaining the semi-transmissive shadow plate 25, wherein the region in an L-shape (shown as a shaded portion) is a semi-transmissive region 26. The other region shown without shading is a full-transmissive region 27. Note that, in the semi-transmissive shadow plate 25 shown in the optical system construction in FIG. 2, the region shown gray is a semi-transmissive region 26 while the region shown open is a full-transmissive region 27.

Incidentally, in the case the projectors 130 are arranged 2×2 vertically and horizontally as shown in FIGS. 1A-1C, for example, the semi-transmissive region 26 is in a changing position depending upon a position of arrangement. FIG. 3(A) illustrates semi-transmissive shadow plates 25 corresponding to the respective positions of the projectors 130 in an arrangement of 2 units×2 units. However, because the projection images from the projectors 130 are thrown inverted vertically and horizontally on the screen SCR, the semi-transmissive shadow plates 25 provided on the projector 130 have respective semi-transmissive regions 26 corresponding positions as shown in FIG. 3(B) on the screen SCR.

The semi-transmissive shadow plates 25 are movably arranged to cope with a form, size and position of an overlap as caused by tiling projection, which is explained with reference to FIG. 4.

Figure 4:
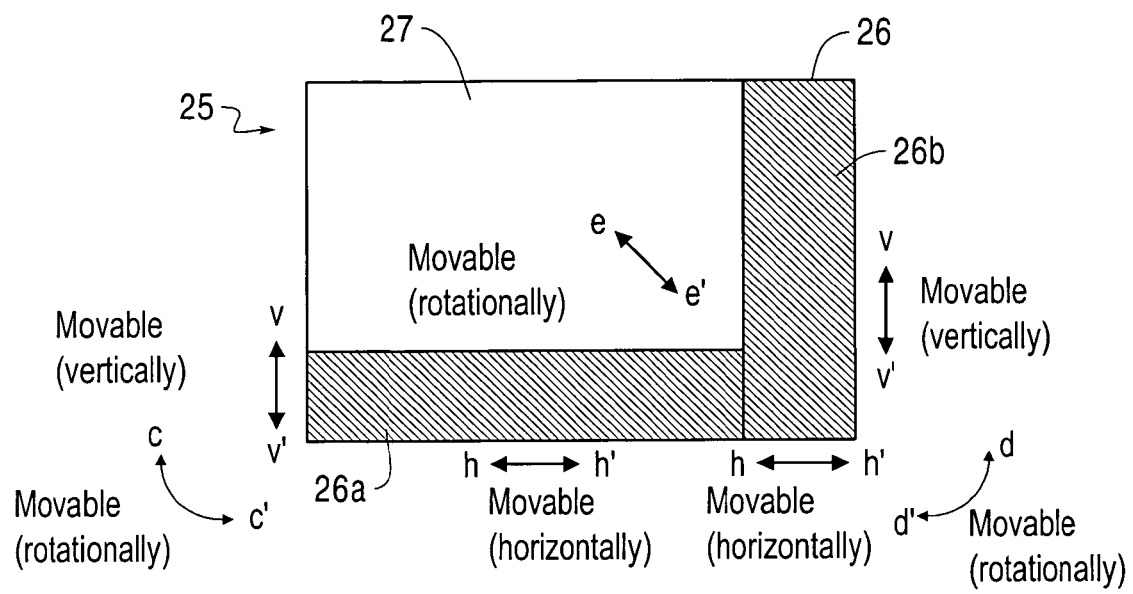
FIG. 4 is a schematic explaining a movement of the semi-transmissive shadow plate shown in FIGS. 3A and 3B.

FIG. 4 is a schematic explaining the movement of the semi-transmissive shadow plate 25 provided on a certain one of the projectors. The region in an L-formed (shown as a shaded portion) is a semi-transmissive region 26 and the other region shown without shading is a fill-transmissive region 27. In FIG. 4, both the horizontal semi-transmissive region 26a and the vertical semi-transmissive region 26b, constituting an L-formed semi-transmissive region 26, are slidable horizontally (in a direction of the arrow h-h') and vertically (in a direction of the arrow v-v') within a predetermined range. Furthermore, both the horizontal semi-transmissive region 26a and the vertical semi-transmissive region 26b are rotatable in a direction of the arrow c-c' or the arrow d-d' within a predetermined angle. Sliding is also possible obliquely (in a direction of the arrow e-e') within a predetermined range.

Incidentally, during sliding of the horizontal semi-transmissive region 26a and the vertical semi-transmissive region 26b, there is a necessity to move those in a state allowing the light corresponding to an overlap caused in tiling projection to positively pass in a semi-transmission state. Accordingly, sliding must be done while keeping a state not to form a gap allowing light to fully transmit through between the horizontal semi-transmissive region 26a and the vertical semi-transmissive region 26b.

Although the exemplary embodiment illustrated in FIG. 4 illustrates that the semi-transmissive region 26 is constituted by the two members, i.e. the horizontal semi-transmissive region 26a and the vertical semi-transmissive region 26b, they both may be integrated in one L-form.

In this manner, in the semi-transmissive shadow plate 25, the semi-transmissive region 26 is movably arranged as shown in FIG. 4. By suitably positioning the semi-transmissive region 26 on the projector 130, it is possible to cope with a form, size and position of an overlap as caused by tiling projection.

The transmissivity of the semi-transmissive region 26 may be fixed at a predetermined transmissivity (preferably, about 50%). However, the transmissivity may be variable.

Figure 5:
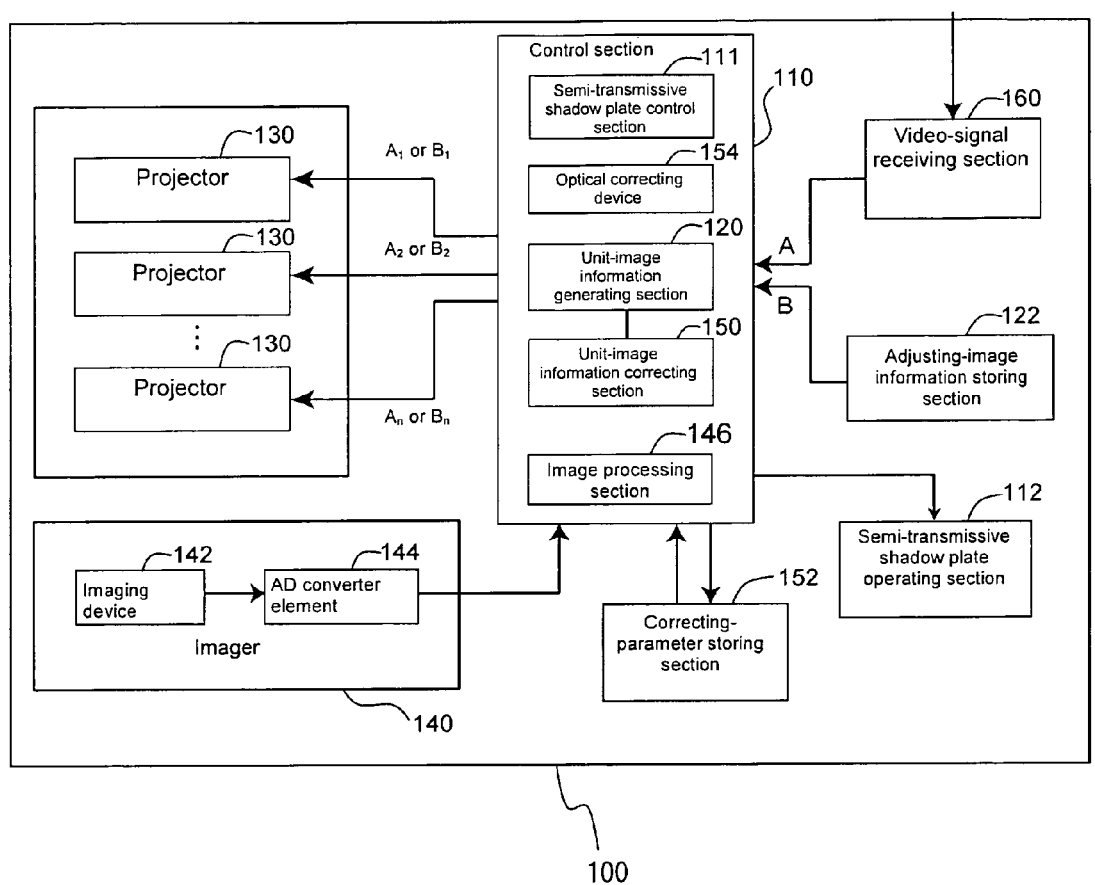
FIG. 5 is a schematic explaining a function of the projector according to the exemplary embodiment.

FIG. 5 is a schematic to explain the function of the multi-projection display 100 according to the present exemplary embodiment.

The multi-projection display 100 has, as shown in FIG. 5, a control section 110 having a semi-transmissive shadow plate control section 111, optical correction device 154, a unit-image information generating section 120, a unit-image information correcting section 150 as image correction device and an image processing section 146; a plurality of projectors 130; an imager 140, a video-signal receiving section 160; an adjusting-image information storing section 122; a correction-parameter storing section 152 and a semi-transmissive shadow plate operating section 112.

The semi-transmissive shadow plate control section 111 generates semi-transmissive shadow plate control information to control the semi-transmissive shadow plates 25 shown in FIG. 4. The semi-transmissive shadow plate control information is supplied to the semi-transmissive shadow plate operating section 112, to move the semi-transmissive shadow plates 25, as was explained with respect to FIG. 4.

Incidentally, concerning semi-transmissive shadow plate control information to move the semi-transmissive shadow plates 25, by giving an instruction to the semi-transparent shadow plate control section 111 from the user, the semi-transparent shadow plate control section 111 can generate semi-transmissive shadow plate control information depending upon the users instruction. Besides, the semi-transparent shadow plate control section 111 can automatically decide an overlap state (form, size, position, etc.) depending upon a photographic image obtained by the imager 140, to thereby generate semi-transmissive shadow plate control information based on a decision result thereof.

The unit-image information generating section 120 may generate respective pieces of unit-image information A1-An corresponding to the plurality of projectors 130 depending upon original-image information A and a function to generate respect pieces of adjusting unit-image information B1-Bn corresponding to the plurality of projectors 130 depending upon original-adjusting-image information B.

The imager 140 has an imaging device 142 to take an image of a predetermined region of an adjusting image projected onto the screen SCR, and an AD converter element 144 to convert an analog signal from the imaging device 142 into a digital signal.

The image processing section 146 performs an image process on a result of imaging by the imager 140 and makes a comparison with the original adjusting image information B, to output a result thereof to the unit-image information correcting section 150.

The adjusting-image information storing section 122 has a function to store information about an adjusting image to be imaged by the imager 140 when correcting the unit-image information A1-An.

Meanwhile, the imager 140 has the imaging device 142 set up within the housing 102 (at immediate inside of the front surface) of the multi-projection display 100.

The imaging device 142 is preferably rotatably structured in order to take an image of a predetermined region of a projection image thrown onto the screen SCR. This makes it possible to take an image over a broad range, and to efficiently take an adjusting image by a reduced number of imaging devices.

The imaging device 142 has functions of zooming and auto focusing. Because this enables properly changing the imaging range and magnification, the freedom and flexibility of imaging is improved or enhanced to conveniently effect auto focus adjustment. The imaging device 142 is arranged to take the whole part of the screen SCR.

The unit-image information correcting section 150 has a function to correct unit-image information A1-An depending upon a result of imaging by the imager 140, in order to make inconspicuous on the screen SCR a boundary (including an overlap) between the unit images projected by the adjacent projectors of the plurality of projectors 130.

The correcting function, to be made for unit-image information A1-An by the unit-image information correcting section 150, enables an intensity adjustment process based on software processing for example, in order to make the light-intensity at the overlap equivalent to the light intensity at other regions (non-overlap regions).

Meanwhile, the other correcting functions, to be made by the unit-image information correcting section 150, includes, for example, a function to compare the entire adjusting image formed based on the four pieces of adjusting unit-image information B1-Bn projected by the four projectors 130 with the original adjusting image information B and to correct a form, position and inclination of unit images to be thrown by the projectors 130, a function to correct a light intensity and color (pixel value) of unit images thrown by the projectors 130.

These correction processes enable an inconspicuous boundary on the screen SCR resulting from an unsuited form, position and/or inclination between the projection images from the projectors 130. Furthermore, a boundary caused by non-continuous light intensity or color can be inconspicuous made on the screen SCR between the projection images from the projectors 130.

Meanwhile, the correction parameter storing section 152 stores a correction parameter determined by the unit-image information correcting section 150 upon correcting unit-image information.

Incidentally, the scope and spirit of the exemplary embodiments do not lie in comparing the entire adjusting image with the original adjusting image information B and thereby correct a form, position and/or inclination of the unit images projected by the projectors 130, as one of the correcting functions possessed by the unit-image information correcting section 150, as further discussed below.

Figure 6:
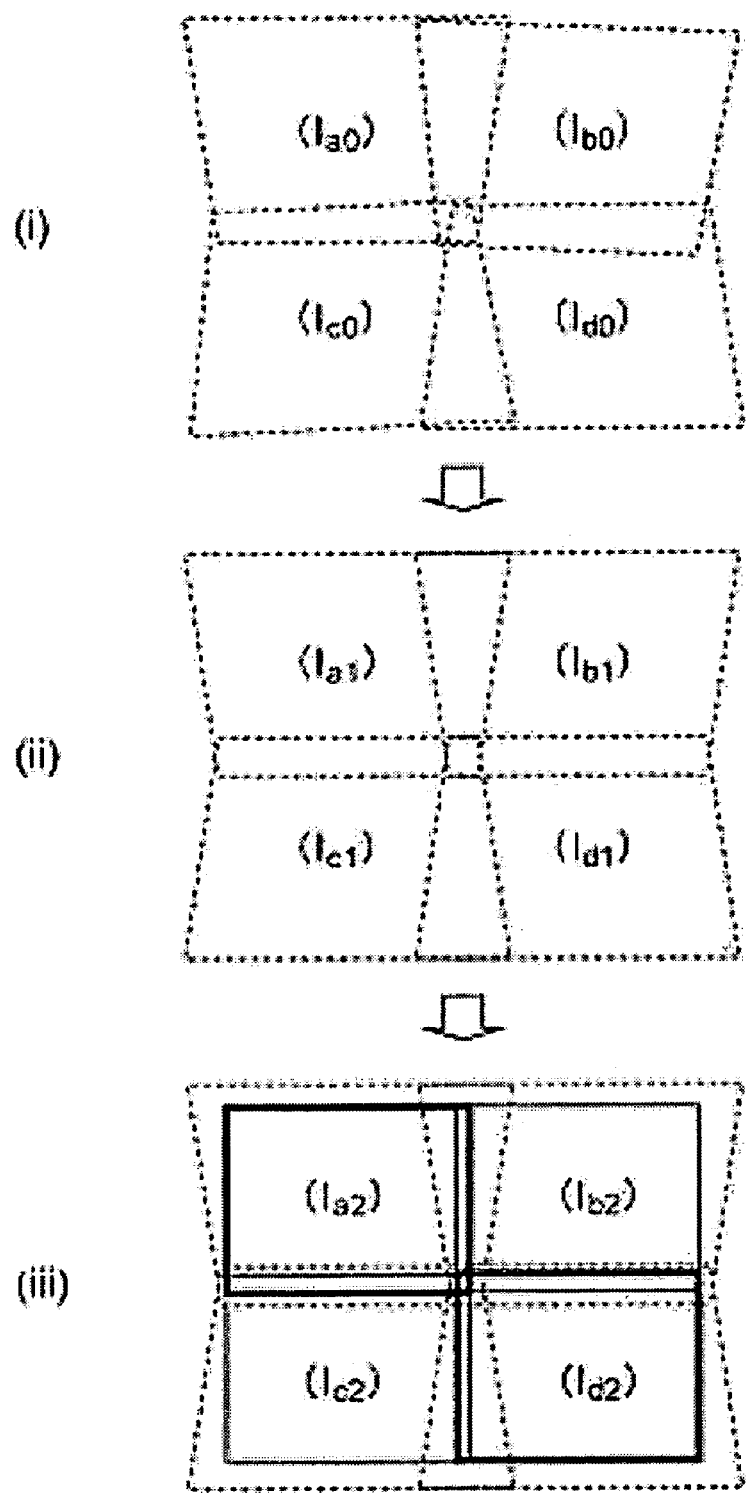

FIGS. 6(i)-6(iii) illustrate a process to correct a form, position and inclination between the images thrown from the projectors 130 in the multi-projection display 100.

First, a pre-adjustment display status is explained. When the original image information A is inputted from the video-signal receiving section 160 to the unit-image information generating section 120, the unit-image information generating section 120 generates unit-image information A1-An corresponding to the projectors 130, depending upon the original-image information A. The projectors 130 project unit images corresponding to the unit-image information A1-An onto the screen SCR. At this time, because the front multi-projection displays 100 are in a pre-adjustment stage, projection images that are deformed are thrown (IaO, IbO, IcO, IdO) as shown in FIG. 6(i).

Here, when the original-adjusting-image information B is inputted from the adjusting-image information storing section 122 to the unit-image information generating section 120, the unit-image information generating section 120 generates adjusting unit-image information B1-Bn depending upon the original-adjusting-image information B. The projectors 130 throw unit images corresponding to the adjusting unit-image information B1-Bn to the screen SCR. Accordingly, because the front multi-projection displays 100 is in a pre-adjustment stage, projection images (IaO, IbO, IcO, IdO) that are deformed are thrown that are deformed as shown in FIG. 6(i), similarly as discussed above.

Then, by use of the imaging device 142 of the imager 140, images are taken of the projection images (IaO, IbO, IcO, IdO) in predetermined regions concerning the adjusting image shown in FIG. 6(i). Thereafter, based on the result thereof, the optical correcting device 154 makes an optical correction for a location and position of the projector housing. Incidentally, in the invention, optical correction may be made for a location and position of the projection lens 24 of projectors 130, etc. instead of the projector housing.

Then, when the original adjusting image information B is again inputted from the adjusting-image information storing section 122 to the unit-image information generating section 120, the projectors 130 throw adjusting unit-image information B1-Bn generated based on the original adjusting image information B, to the screen SCR. At this time, because the multi-projection display 100 is already corrected for the location and position of projectors depending upon the foregoing imaging result, projection images (Ia1, Ib1, Ic1, Id1) relieved of deformation are thrown to the screen SCR, as shown in FIG. 6(ii).

Then, by use of the imaging device 142 of the imager 140, the projection images (Ia1, Ib1, Ic1, Id1) are taken in terms of the adjusting image shown in FIG. 6(ii). Thereafter, the unit-image information correcting section 150 decides a correction parameter for use in correcting the unit-image information, depending upon the imaging result. The determined correction parameter is stored to the correction-parameter storing section 152. Thereafter, based on the correction parameter, a plurality of pieces of unit-image information A1-An are to be generated from the original-image information A.

Due to this, when the original image information A inputted from the image-signal receiving section 160 is inputted to the unit-image information generating section 120, the unit-image information generating section 120 generates unit-image information depending on the original image information A. On this occasion, the unit-image information is corrected by the correction parameter, to generate a corrected version of unit-image information A1-An.

Accordingly, the projectors 130 throw unit images corresponding to the corrected version of unit-image information A1-An, onto the screen SCR. At this time, because the front multi-projection display 100 is already adjusted, the projection images (Ia2, Ib2, Ic2, Id2) from the projectors 130 are aligned with accuracy, as shown in FIG. 6(iii).

Meanwhile, the multi-projection display 100 in the present exemplary embodiment is provided with the semi-transmissive shadow plate 25 as was shown in FIG. 4 in each projector 130. Light intensity adjustment is enabled at an overlap by implementing a light amount adjustment using the semi-transmissive shadow plates 25. Meanwhile, the semi-transmissive shadow plates 25 is provided inward of the projector housing rather than the projection lens 24, i.e. closer to the light-exit end of the cross dichroic prism 23.

Furthermore, the multi-projection display 100 has a semi-transmissive shadow plate control section 111 to generate semi-transmissive shadow plate control information to control movement of the semi-transmissive shadow plates 25, and a semi-transmissive shadow plate operating section 112 to operate the semi-transmissive regions 26 of the semi-transmissive shadow plates 25 based on the semi-transmissive shadow plate control information. This makes it possible to establish an optimal or enhanced light-intensity adjustment range in conformity to a form, size and position of an overlap of the projection images thrown from the four projectors 130. Thus, the entire projection image projected by tiling can accurately be made uniform in its light intensity.

The semi-transmissive shadow plates 25 can be movably controlled by giving a users instruction to the semi-transmissive shadow plate control section 111. However, movement control of the semi-transmissive shadow plates 25 can be made based on a photographic image obtained due to taking the projection image by the imager 140. In this manner, by movement control of the semi-transmissive shadow plates 25 based on a photographic image, the optimal light-intensity adjustment range can be suitably and/or automatically established corresponding to the overlap form, size and position.

After light intensity adjustment by semi-transmissive shadow plates 25, it is possible to add a light-intensity adjustment process based on software processing in the unit-image information correcting section 150 as the image correcting device depending on the status of light-intensity adjustment.

Even in the case of light-intensity adjustment made by the semi-transmissive shadow plates 25, the light intensity adjustment obtained may not be optimal at the overlap due to variation in light intensity between the adjacent projectors. In such a case, more suitable light-intensity adjustment may be made available by performing a light-intensity adjustment process due to the unit-image information correcting section 150 in addition to light-amount adjustment by the semi-transmissive shadow plates 25.

Figure 19:
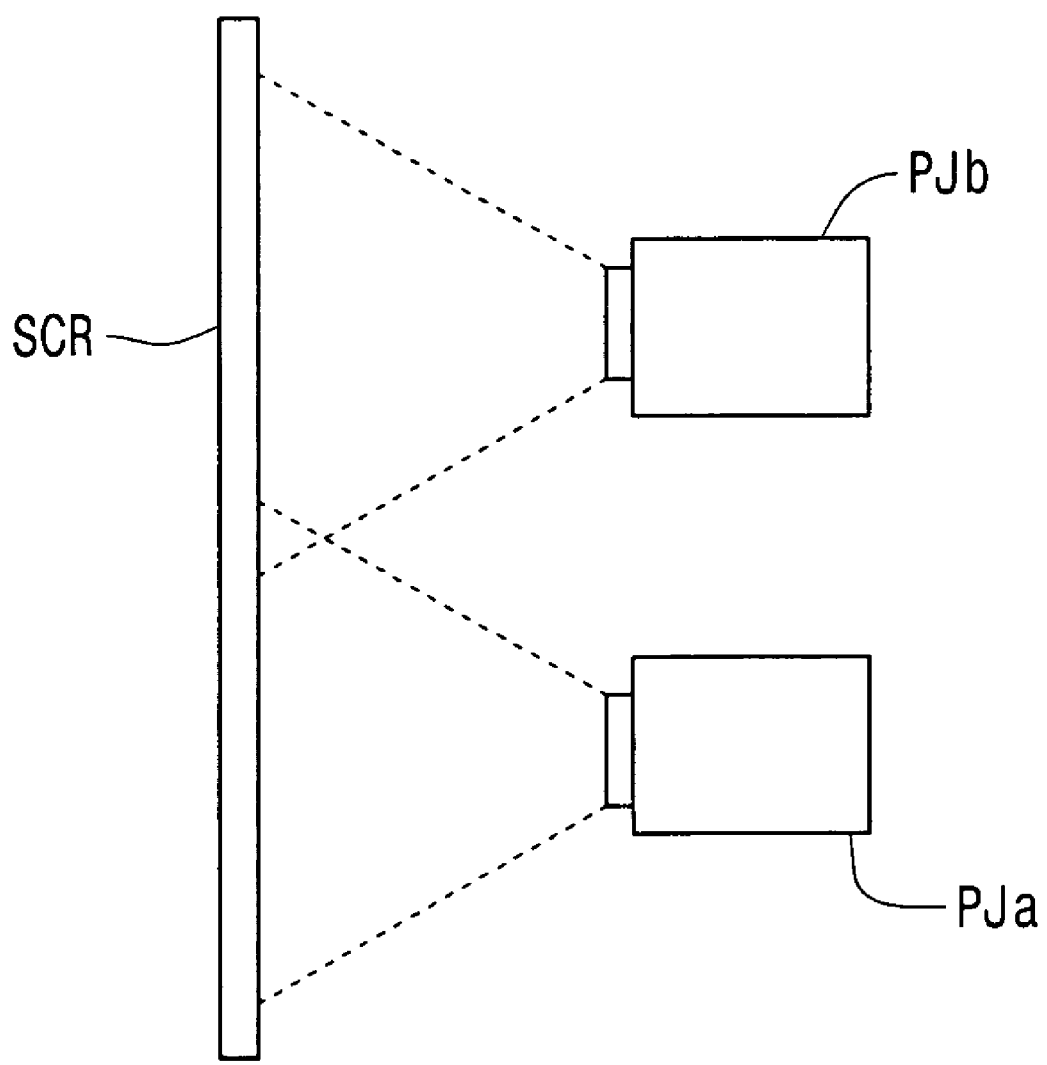
FIG. 19 is a schematic explaining light-intensity adjustment overlap made by two adjacent projectors.

In an exemplary embodiment including light-intensity correction process by the unit-image information correcting section 150, light-intensity adjustment is made to an overlap caused by two adjacent projectors (i.e., PJa, PJb in FIGS. 1(A) and 19).

At first, the projection images Ia1, Ib1 (projection images already corrected for their forms) from the adjacent projectors PJa, PJb are assumably thrown in a state having an overlap. In this case, there is assumably an overlap between the projection image Ia1 from the projector PJa shown in FIG. 7(A) and the projection image m1 from the projector PJb shown in the same FIG. 7(B) such that those are coincident between a broken line a1 and a solid line b1, a broken line a2 and a broken line b2 and a solid line a3 and a broken line b3 on the respective projection images Ia1, Ib1 in FIGS. 7(A) and 7(B).

For such an overlap of projection images, it is satisfactory to make a correction using a function that the output values from the projectors PJa, PJb have a sum of 1. However, γ-correction has been done to the outputs from the projectors PJa, PJb, which is to be taken into consideration.

FIG. 8(A) shows a relationship between a pixel value of certain color and an output value from the projector, wherein, when RGB colors are expressed by 8 bits, the pixel value in a color takes a value 0-255. Because γ-correction has been done in each projector PJa, PJb, the relationship between pixel value and output value is given as in FIG. 8(A). Accordingly, when taking such γ-correction into consideration, there is an actual need to correct the pixel value by use of such a function as in FIGS. 8(B) and 8(C), in order to provide an output value of 1 from the projectors PJa, PJb to the overlap.

FIGS. 9A-9E are schematics representing a light-intensity distribution on the screen. FIGS. 9(A) and 9(B) are projection images from the two projectors PJa, PJb, whose light-intensity distributions at a horizontal line c in FIGS. 9(A) and 9(B) are shown in FIGS. 9(C) and 9(D). As shown in FIGS. 9(C) and 9(D), the image thrown from the projector PJa, PJb onto the screen has a light intensity higher at its center and becoming lower as going away from the center because of the influence of the projection lens and light source.

The curve shown by the solid line in FIG. 9(E) is an example of a light-intensity design value at the on-screen horizontal line c in the case of projecting images by tiling from the two projectors PJa, PJb to give an overlap. In this manner, correction is made to the output values of the two projectors PJa, PJb in a manner taking a curve shown by the solid line at the overlap.

By performing a light-intensity adjustment process due to the unit-image information correcting section 150 as in the above in addition to the foregoing light-intensity adjusting operation due to the semi-transmissive shadow plates, intensity-level adjustment is available more suitably at the overlap.

As to whether or not to perform a light-intensity adjustment process due to the unit-image information correcting section 150, the unit-image information correcting section 150 can determine it on the basis of the photographic image obtained by taking the projection image by the imager 140. Thus, intensity-level adjustment process mentioned above can be implemented.

In this manner, by performing a light-intensity adjustment based on software processing by the unit-image information correcting section 150 in addition to the light-intensity adjustment due to the semi-transmissive shadow plates 25, more suitable intensity-level adjustment is made available. In the images projected by tiling in a state having an overlap, light intensity can be given to the overlap equivalently to the light intensity at other region. Thus, tiling-projected images can be further improved in quality.

In the example shown in FIGS. 7A-9E, explanation was on the light-intensity adjustment based only on software processing. However, actually, light-intensity adjustment process is performed by taking into consideration a transmissivity of the semi-transmissive region 26 at the semi-transmissive shadow plate 25, a reflectivity at the reflectivity-changed region 28 provided on the reflection mirror 16, 18, and further a transmissivity at the transmissivity-changed region 29 provided on the dichroic mirror 15.

Incidentally, the exemplary embodiments are not limited to the above exemplary embodiment but can be practiced in various modifications without departing from the scope and spirit of the exemplary embodiments. For example, although the above exemplary embodiment includes the example in which the semi-transmissive shadow plates 25 were arranged on the light-exit side of the cross dichroic prism 23, the provisional position of the semi-transmissive shadow plates 25 is conceivable positioned in various locations in addition to the above described exemplary embodiments.

Figure 10:
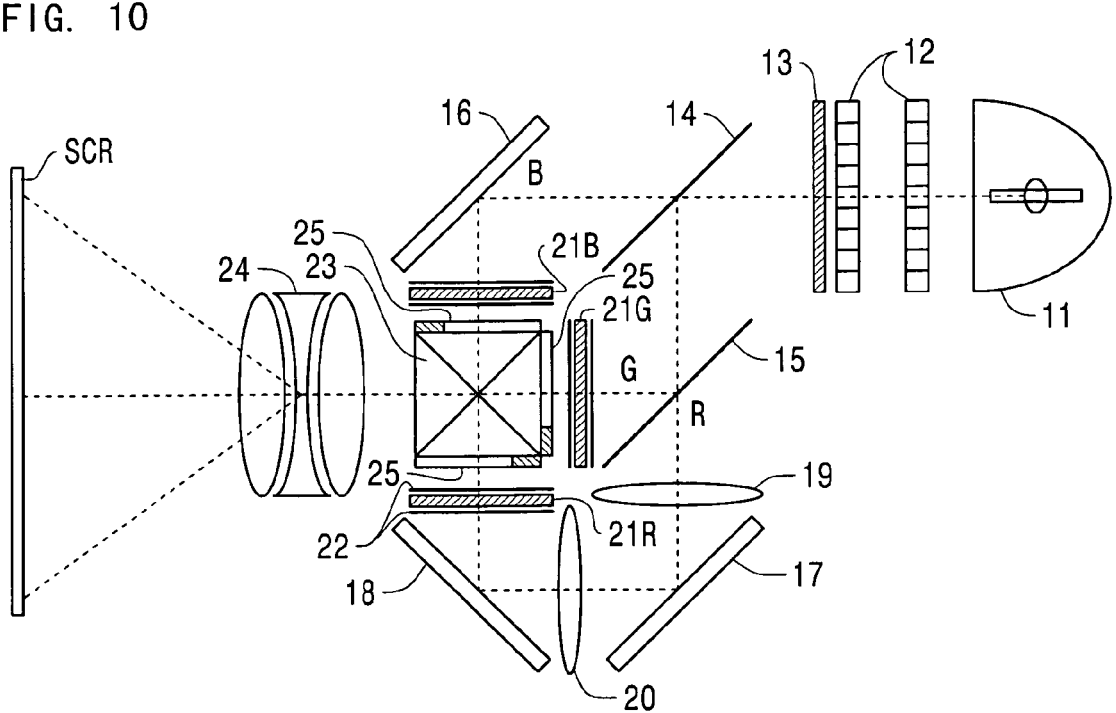
FIG. 10 is a schematic showing a construction example of an optical system of a projector in the case that semi-transmissive shadow plates are provided on light-exit sides of the respective liquid-crystal light valves.
Figure 11:
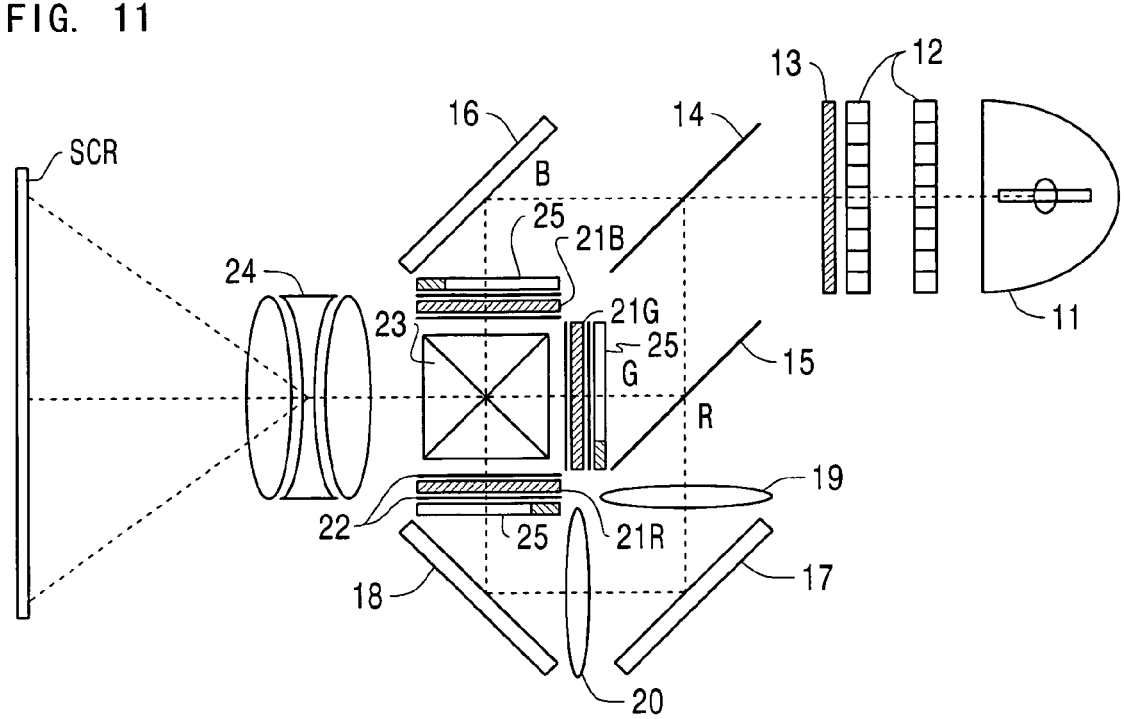
FIG. 11 is a schematic showing a construction example of an optical system of a projector in the case that semi-transmissive shadow plates are provided on light-incident sides of the respective liquid-crystal light valves.

FIGS. 10 and 11 show such examples, which correspond to FIG. 2 used with respect to the description of the foregoing exemplary embodiment. The difference from FIG. 2 lies only in the position where the semi-transmissive shadow plates 25 are provided. Hence, the same references are attached to the same elements as those of FIG. 2.

In FIG. 10, the semi-transmissive shadow plates 25 are provided on light-incident sides of the cross dichroic prism 23, i.e. on the opposed surfaces of cross dichroic prism 23 to the respective light-exit surfaces of the liquid-crystal light valve 21R, liquid-crystal light valve 21 G and liquid-crystal light valve 21 B.

Meanwhile, in FIG. 11, the semi-transmissive shadow plates 25 are respectively provided on light-incident sides of liquid-crystal light valve 2 1R, liquid-crystal light valve 21G and liquid-crystal light valve 21B.

Incidentally, in the semi-transmissive shadow plates 25 shown in FIGS. 10 and 11, the region shown in gray is the semi-transmissive region 26 while the open region is the full-transmissive region 27, similarly to FIG. 2. By arranging the semi-transmissive shadow plates 25 as in FIGS. 10 and 11, light intensity adjustment is made possible in the same positions as in FIG. 2.

Due to this, in the multi-projection display 100 having such projectors 130 as shown in FIGS. 10 and 11, light intensity can be properly adjusted at an overlap where making a tiling-projection by the plurality of projectors 130 to the screen SCR in a state having an overlap thereon, similarly to the foregoing embodiment.

Meanwhile, there is an effect that, by providing the semi-transmissive shadow plates 25 separately based on the respective color components as in FIGS. 10 and 11, the heat to be applied to the semi-transmissive shadow plates 25 may be reduced. Incidentally, as shown in FIGS. 10 and 11, it is also possible to further add the light-intensity adjustment process based on software processing in the unit-image information correcting section 150.

Figure 12:
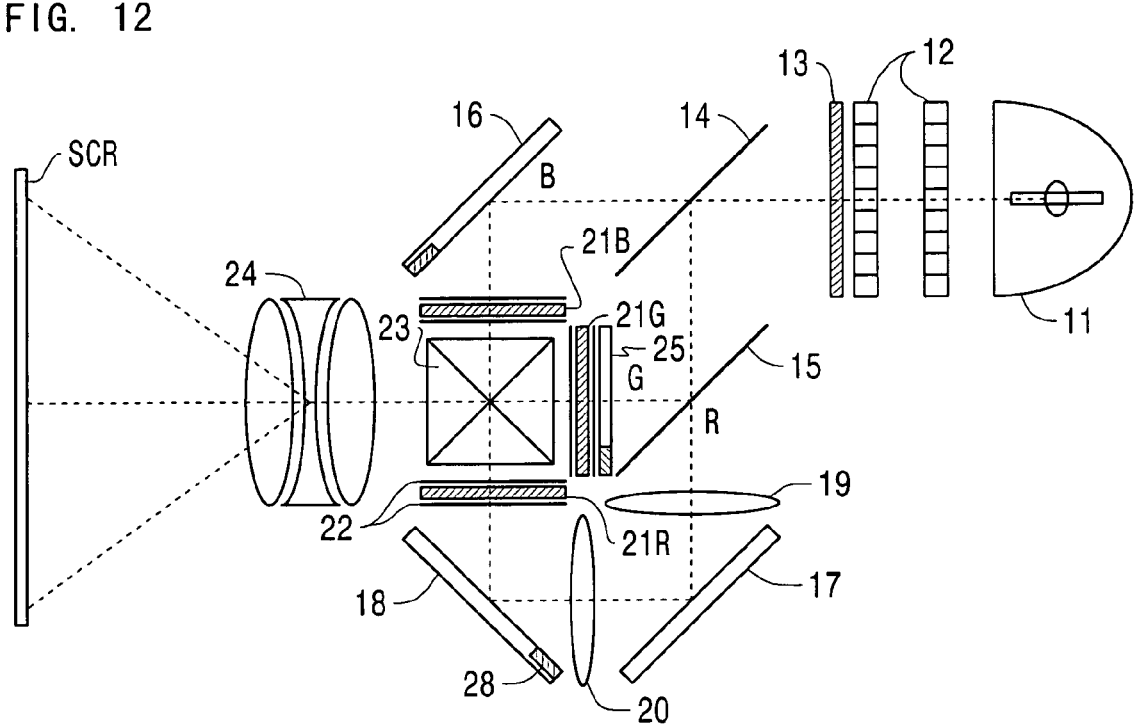
FIG. 12 is a schematic showing a construction example of an optical system of a projector in the case that a reflectivity-changed region is provided in part of the reflector plate.
Figure 13:
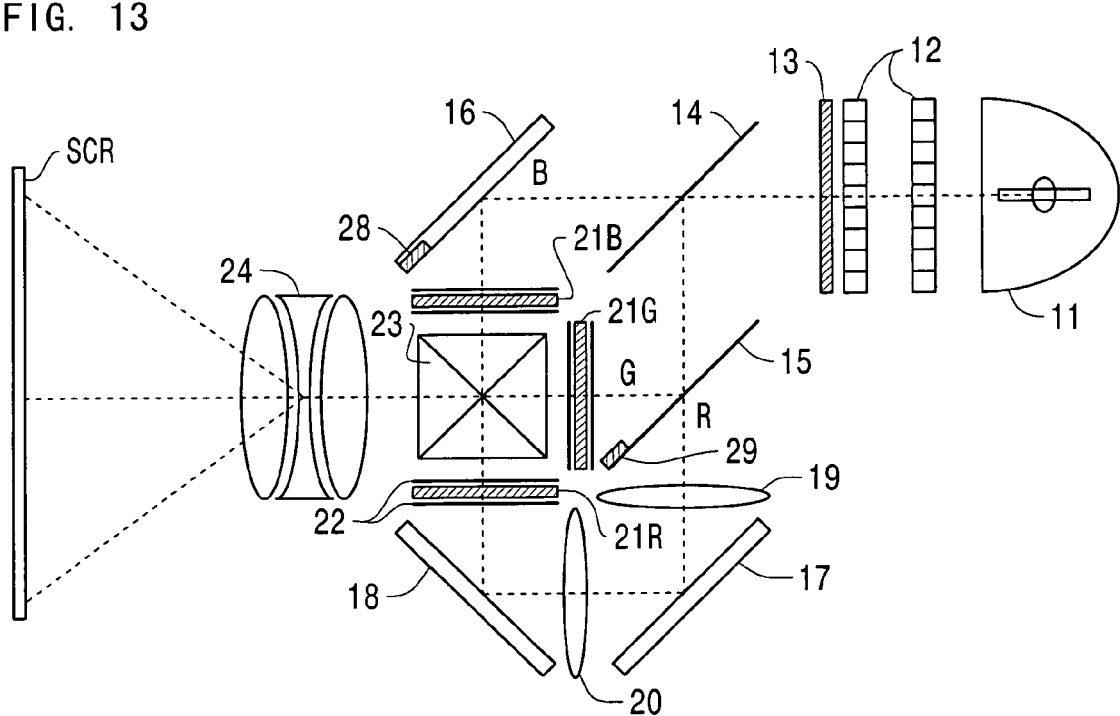
FIG. 13 is a schematic showing a construction example of an optical system of a projector in the case that a transmissivity-changed region is provided in part of the dichroic mirror.

Meanwhile, as shown in FIGS. 12 and 13, by providing the reflector plate 16, 18 or dichroic mirror 15, in part, with a region to change reflectivity and/or transmissivity, it is possible to obtain an effect similarly to the provision of semi-transmissive shadow plates 25 in such positions as shown in FIG. 2, 10 and/or 11.

In an exemplary embodiment, FIG. 12 illustrates that reflectivity-changed regions 28 are provided respectively in parts of a reflector plate 16 to cause blue light to enter the liquid-crystal light valve 21B and in a reflector plate 18 for incidence of red light upon the liquid-crystal light valve 21R, wherein, for green light, a semi-transmissive shadow plate 25 is provided on a light-incident side of the liquid-crystal light valve 21G for green light similarly to FIG. 11.

Due to this, blue light and red light are adjusted in light amount (reduced in light) in their incident portion of light thereon by the reflectivity-changed regions 28 respectively provided in the corresponding reflector plates 16 and 18, followed by entering the liquid-crystal light valves 21B and the liquid-crystal light valves 21R respectively. Meanwhile, green light is reduced in the light passing the semi-transmissive region 26 by the semi-transmissive shadow plate 25, followed by entering the liquid-crystal light valves 21G similarly to FIG. 11. This makes it possible to adjust the light intensity also in FIG. 12 at the same regions as those in FIG. 2.

Meanwhile, FIG. 13 is an example that a reflectivity-changed region 28 is provided in part of the reflector plate 16 to cause blue light to enter the liquid-crystal light valve 21B, wherein a transmissivity-changed region 29 is provided in part of the dichroic mirror 15 for reflecting green light but passing red light.

In the case of FIG. 13, blue light is reduced in part of the entering light by the transmissivity-changed regions 28 provided on the reflector mirror 16, followed by entering the liquid-crystal light valves 21B. Meanwhile, green light is reduced by the reflectivity-changed regions 29 provided on the dichroic mirror 15, followed by reflection into the liquid-crystal light valve 21G. Meanwhile, red light is reduced by the transmissivity-changed region 29 and passed the dichroic mirror 15, followed by entering the liquid-crystal light valve 21R by way of the reflector plate 17, focus lens 20 and reflector plate 18. This makes it possible to correct the light intensity at the same regions as those in FIG. 2.

Meanwhile, the light-amount adjusting device (reflectivity-changed regions 28 provided in the semi-transmissive shadow plate 25 and reflection mirrors 16, 18, the transmissivity-changed region 29 provided in the dichroic mirror 15, etc.) explained so far may have its transmissivity or reflectivity changing with a position on the projection image. For example, exemplifying the semi-transmissive shadow plate 25, the output light from the semi-transmissive region 26 may have a transmissivity changing in a curve form such that it changes as shown by a1-a3 and b1-b3 in FIGS. 7(C) and 7(D) in accordance with a position on the projection image. Meanwhile, although showing is omitted, gradient is given to transmissivity such that output light linearly changes from 0% to 100% in accordance with a position on the projection image.

By using such a light-amount adjusting device, light intensity adjustment can be effected for an overlap of projection images without using software processing, in addition to elimination of "black float". Incidentally, it is natural that light-intensity adjustment based on software processing can be effected as fine adjustment by use of the photographic image information from the imager 140.

Meanwhile, the light-amount adjusting device can use a liquid-crystal light valve having rough (large) pixels capable of changing transmissivity only at an overlap region, an electro-chromic glass capable of partly controlling transmissivity, or the like. Where using such a liquid-crystal light valve or electro-chromic glass, the transmissivity is adjusted depending upon a photographic image from the imager 140 such that the output light, at the overlap, takes such a form as a1-a3 and b1-b3 in FIGS. 7(C) and 7(D).

In the meanwhile, although the projector of the exemplary embodiments may use a lamp as a light source, application is possible to a projector using any solid light source.

Figure 14:
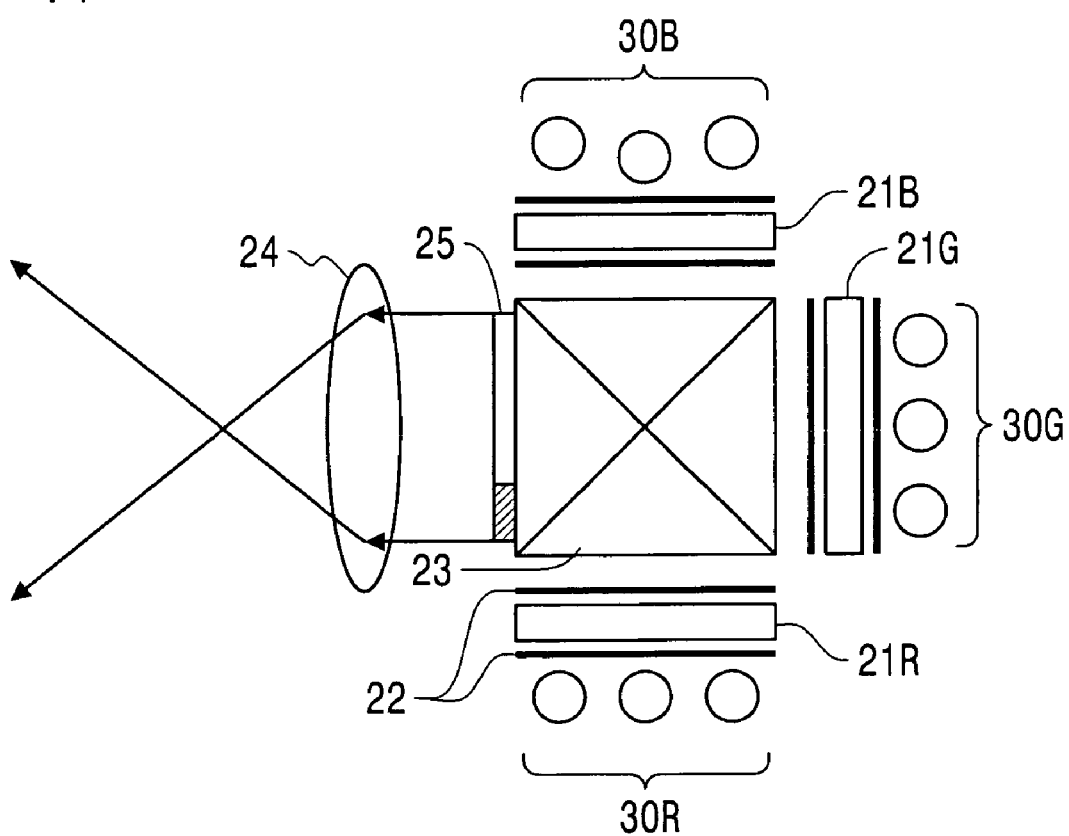
FIG. 14 is a schematic showing a construction example of an optical system in the case that a solid light source (LED) is used as a light source and a semi-transmissive reflector plate is provided on a light-exit side of the cross dichroic prism.
Figure 15:
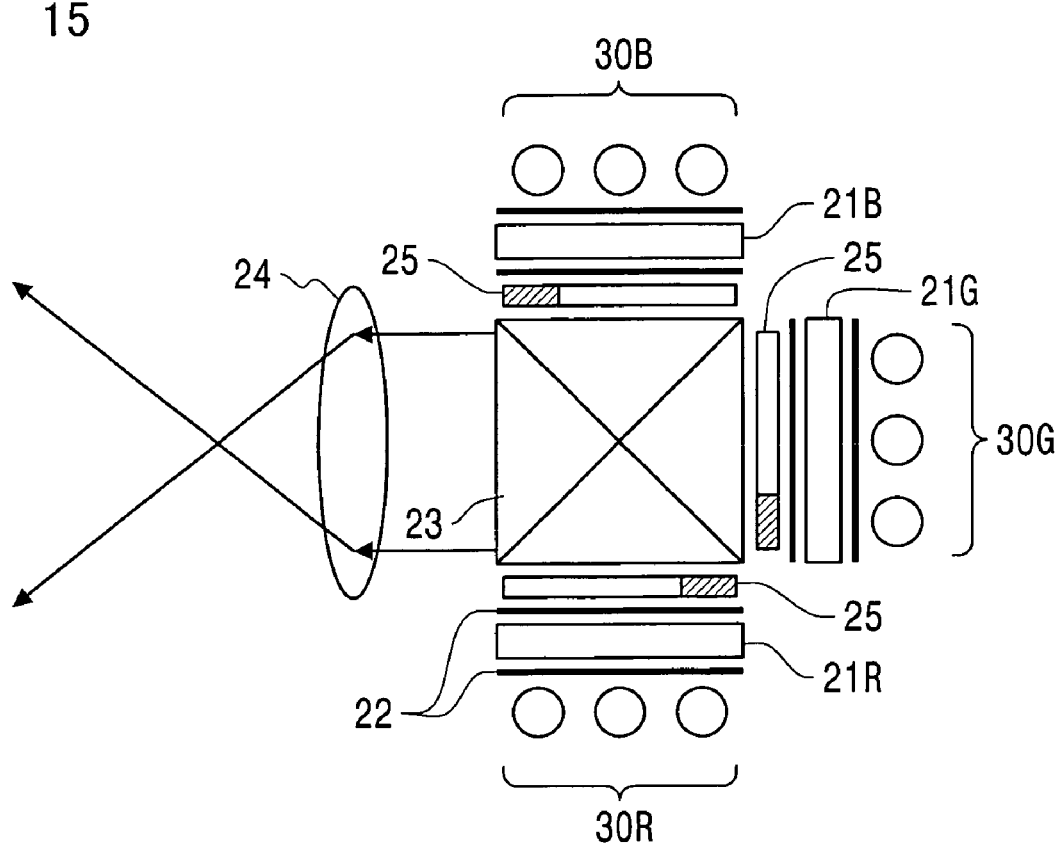
FIG. 15 is a schematic showing a construction example of an optical system in the case that a solid light source (LED) is used as a light source and semi-transmissive reflector plates are respectively provided on light-exit sides of the liquid-crystal light valves.

FIGS. 14 and 15 are structural schematics of projectors 130 using a red LED 30R, green LED 30D and blue LED 30B as a solid light source.

FIG. 14 is an exemplary embodiment with a semi-transmissive shadow plate 25 on a light-exit side of the cross dichroic prism 23, similarly to FIG. 2. FIG. 15 is an exemplary embodiment of semi-transmissive shadow plates 25 on a light-incident side of the cross dichroic prism 23, that is, on light-exit sides of the liquid-crystal light valves 21R, 21G, 21B to the cross dichroic prism, similarly to FIG. 10.

As in FIGS. 14 and 15, also in the projector 130 using a solid light source as a light source, a similar effect in the foregoing exemplary embodiment can be obtained by providing a semi-transmissive shadow plate 25 in a predetermined position inner of the projector housing than the projection lens 24.

Figure 16:
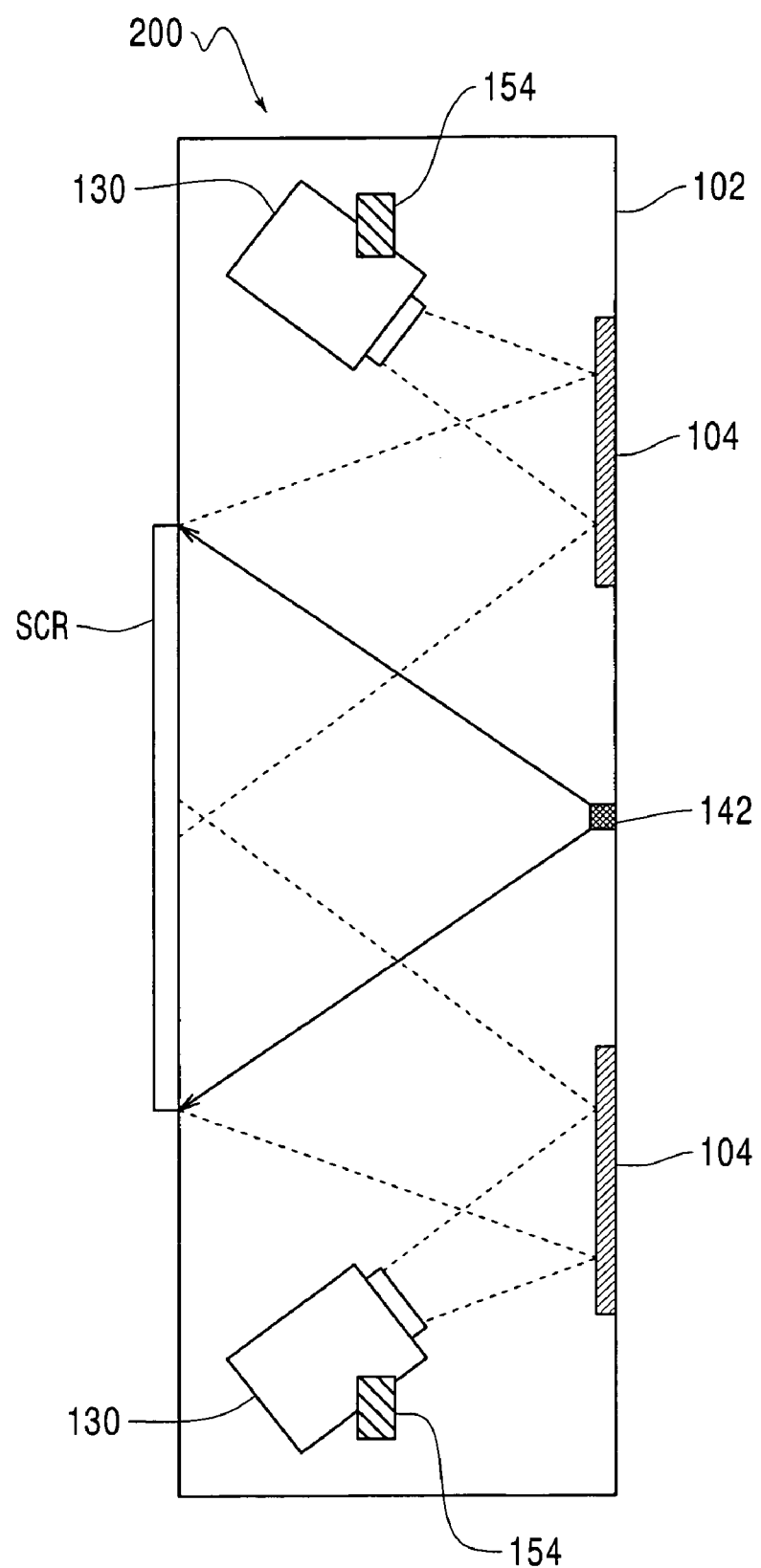
FIG. 16 is a schematic view showing a construction in the case the invention is applied to a rear multi-projection display.

Meanwhile, although the multi-projection display 100 of the exemplary embodiments was so far explained as a front multi-projection display, the multi-projection display 100 of the exemplary embodiments may be a rear multi-projection display 200 as shown in FIG. 16.

The rear multi-projection display 200 shown in FIG. 16 is a rear multi-projection display that the projection images from the plurality of projectors 130 (only two are shown in FIG. 16) arranged within the housing 102 are reflected upon reflector plates 104 and projected onto a transmission screen SCR. The rear multi-projection display 200 is provided with an imaging device 142 to take an image on the screen SCR within the housing 102, and an optical correction device 154 to optically correct for the location and position of each projector housing 102.

The projectors 130 used in the rear multi-projection display 200 can be the same in structure as those used in the foregoing exemplary embodiments, and hence explanation thereof is omitted.

Meanwhile, although the foregoing exemplary embodiments had a plurality of projectors 130 in a 2×2 arrangement, such an arrangement is not limitative. For example, nine projectors 130 can be used in an application to a 3×3 arrangement to tile projection by those nine projectors 130.

Figure 17:
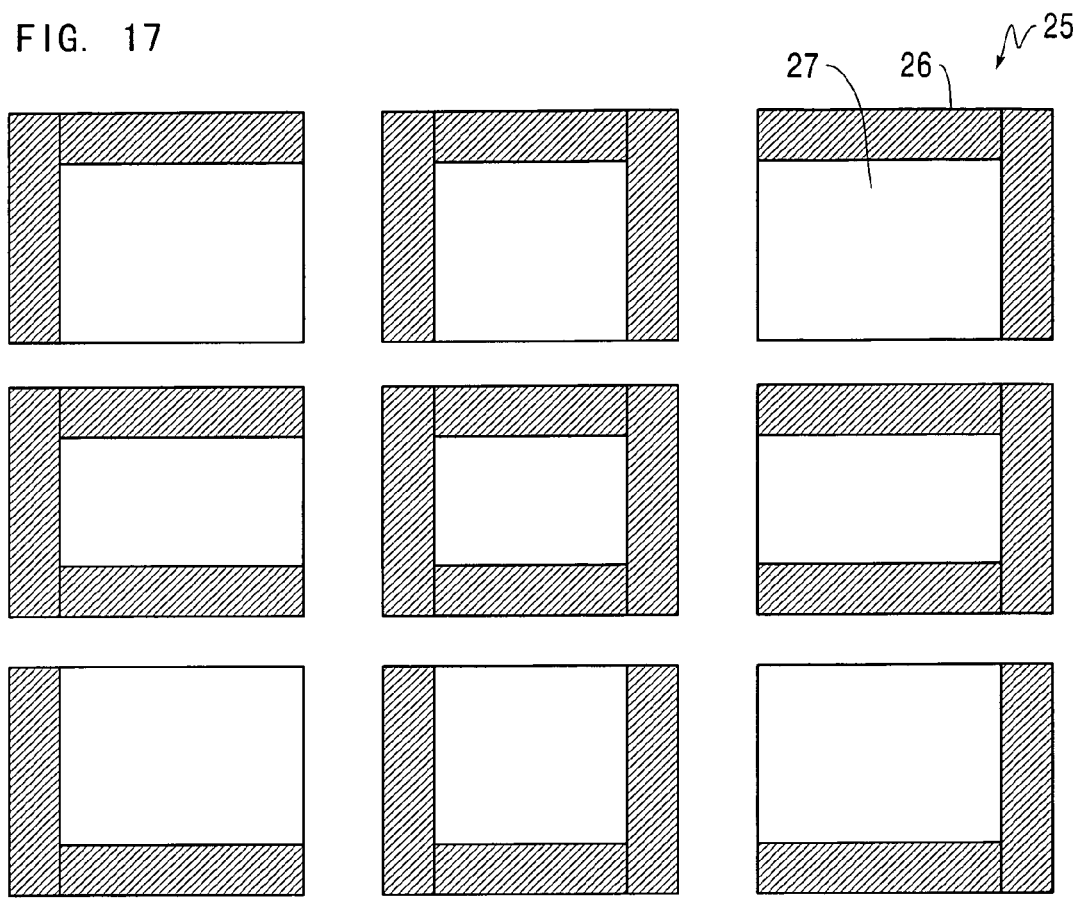
FIG. 17 is a schematic showing an example of semi-transmissive shadow plates used in the projectors in the case of effecting a tiling projection by projectors in an arrangement of 3×3 horizontally and vertically.
Figure 18:
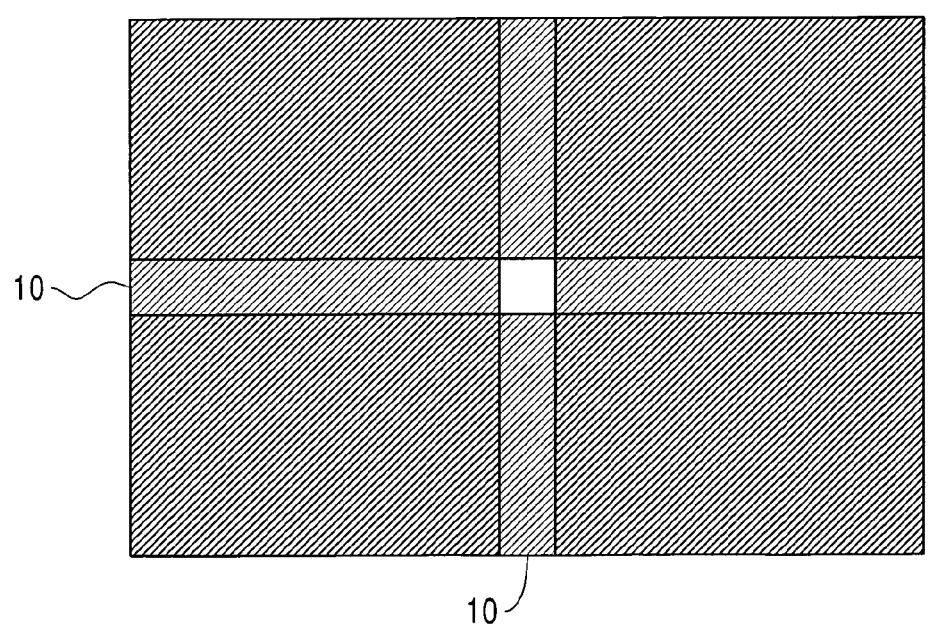
FIG. 18 is a schematic explaining "black float" caused by tiling projection by a plurality of projectors.

In such a case, the similar effect to the explanation in the foregoing embodiment can be obtained by preparing semi-transmissive shadow plates 25 as in FIG. 17 to cope with an overlap of projection images caused by the adjacent projectors 130 and provide the semi-transmissive shadow plates 25 respectively on the projectors 130 meeting the arrangement positions of the projectors 130 in a manner explained in the foregoing embodiment. Incidentally, in this case, the semi-transmissive regions of the semi-transmissive shadow plates 25 provided on the respective projectors 130 are each made in the form of L, squared-U or square depending upon the arrangement position of the projector 130, as can be seen from FIG. 17.

Incidentally, in this case, it is natural that, in each projector 130, the reflector plate 16, 18 may be provided with reflectivity-changed region 28 or the dichroic mirror 15 may be provided with a transmissivity-changed region 29 as explained in FIGS. 12 and 13, instead of the semi-transmissive shadow plates.

Meanwhile, the foregoing exemplary embodiments explained the case using the liquid-crystal light valves as electro-optical modulators. However, this is not limitative but application is possible to those using dynamic mirror devices as light switch elements.

Meanwhile, FIG. 5 used in the foregoing exemplary embodiments shows the example that the control section 110, the semi-transmissive shadow plate operating section 112, the correction parameter storing section 152, etc. were provided separately from the projector 130, those constituent elements can be built in the projector 130.

In such a case, all the projectors 130 to tile projection may have those constituent elements, at least one of which is in a form to function as explained in the foregoing exemplary embodiments. However, of a plurality of projectors 130 to tile projection, a certain one may have those constituent elements wherein the relevant projector plays a role like a host computer thus effecting a function as explained in the foregoing exemplary embodiments. Furthermore, the video-signal receiving section 160 or adjusting-image information storing section 122 may be provided in one of a plurality projectors 130 to effect tiling projection.

What is claimed is:

1. A multi-projection display to project images, comprising:
   a plurality of projectors to project a plurality of unit images by tiling in a state having an overlap in part thereof, each of the projectors including a projector housing;
   a projection lens;
   a light-amount adjusting device, to adjust an amount of light to the overlap, provided inner of the projector housing than the projection lens of each of the projectors;
   a cross-dichroic prism, the light-amount adjusting device being provided on a light-exit side of the cross-dichroic prism;
   a reflector plate; and
   a reflectivity-changed region to adjust a reflectivity of the reflector plate, being provided in part of the reflector plate, the reflectivity-changed region being used as the light-amount adjusting device.

2. The multi-projection display according to claim 1, further including electro-optical modulators to light components, the light-amount adjusting device being provided on at least one of a light-incident side and a light-exit side of a corresponding one of the electro-optical modulators to light components.

3. The multi-projection display according to claim 1, the light-amount adjusting device being formed by a semi-transmissive shadow plate having a semi-transmissive region.

4. The multi-projection display according to claim 2, the reflectivity-changed region to adjust a reflectivity of the reflector plate being provided in part of the reflector plate to cause light from a light source to enter the electro-optical modulator, the reflectivity-changed region being used as the light-amount adjusting device.

5. The multi-projection display according to claim 2, further including a transmissivity-changed region to adjust a transmissivity of a dichroic mirror, the transmissivity-changed region being provided in part of the dichroic mirror and being used as the light-amount adjusting device.

6. The multi-projection display according to claim 1, further including an imaging device to take an image of a projection image.

7. The multi-projection display according to claim 1, the light-amount adjusting device being allowed to set a light-amount adjusting range in accordance with a state of the overlap.

8. The multi-projection display according to claim 7, setting a light-amount adjusting range being based on a photographic image obtained by the imaging device.

9. The multi-projection display according to claim 1, the light-amount adjusting device having at least one of a transmissivity and reflectivity changing with a position on the projection image.

10. The multi-projection display according to claim 1, further including an image correcting device to enable a light-intensity adjustment process based on software processing, to perform a light-intensity adjustment process by the image correcting device in addition to light-amount adjustment by the light-amount adjusting device.

11. The multi-projection display according to claim 10, the light-intensity adjustment process by the image correcting device being performed based on a photographic image obtained by the imaging device.

12. A projector for use in a multi-projection display to project images from a plurality of projectors to project a plurality of unit images by tiling in a state having an overlap in part of adjacent ones of projection images, the projector comprising:
   a projector housing;
   a projection lens;
   a light-amount adjusting device to adjust an amount of light to the overlap, provided inner of the projector housing than the projection lens;
   a cross-dichroic prism, the light-amount adjusting device being provided on a light-exit side of the cross-dichroic prism;
   a reflector plate; and
   a reflectivity-changed region to adjust a reflectivity of the reflector plate, being provided in part of the reflector plate, the reflectivity-changed region being used as the light-amount adjusting device.

13. A multi-projection display to project images, comprising:
   a plurality of projectors to project a plurality of unit images by tiling in a state having an overlap in part thereof, each of the projectors including a projector housing;
   a projection lens;

a light-amount adjusting device, to adjust an amount of light to the overlap, provided inner of the projector housing than the projection lens of each of the projectors;

a reflector plate; and a reflectivity-changed region to adjust a reflectivity of the reflector plate, being provided in part of the reflector plate, the reflectivity-changed region being used as the light-amount adjusting device.

14. A multi-projection display to project images, comprising:

a plurality of projectors to project a plurality of unit images by tiling in a state having an overlap in part thereof, each of the projectors including a projector housing;

a projection lens;

a light-amount adjusting device, to adjust an amount of light to the overlap, provided inner of the projector housing than the projection lens of each of the projectors;

a transmissivity-changed region to adjust a transmissivity of a dichroic mirror, the transmissivity-changed region being provided in part of the dichroic mirror and being used as the light-amount adjusting device;

a reflector plate; and a reflectivity-changed region to adjust a reflectivity of the reflector plate, being provided in part of the reflector plate, the reflectivity-changed region being used as the light-amount adjusting device.

15. A multi-projection display to project images, comprising:

a display housing;

a plurality of projectors to project a plurality of unit images by tiling in a state having an overlap in part thereof, each of the projectors including:

a projector housing;

a projection lens;

a light-amount adjusting device, the light-amount adjusting device adjusting an amount of light to the overlap, the light-amount adjusting device being provided inner of the projector housing than the projection lens of each of the projectors, the plurality of projectors being disposed in the display housing;

a reflector plate; and a reflectivity-changed region to adjust a reflectivity of the reflector plate, being provided in part of the reflector plate, the reflectivity-changed region being used as the light-amount adjusting device.

* * * * *